US011509385B1

(12) United States Patent
Schuman

(10) Patent No.: US 11,509,385 B1
(45) Date of Patent: Nov. 22, 2022

(54) ANGLE DIVERSITY MULTIPLE INPUT MULTIPLE OUTPUT RADAR

(71) Applicant: SRC, Inc., North Syracuse, NY (US)

(72) Inventor: Harvey K. Schuman, Fayetteville, NY (US)

(73) Assignee: SRC, Inc., North Syracuse, NY (US)

( * ) Notice: Subject to any disclaimer, the term of this patent is extended or adjusted under 35 U.S.C. 154(b) by 200 days.

(21) Appl. No.: 17/140,596

(22) Filed: Jan. 4, 2021

Related U.S. Application Data

(60) Provisional application No. 63/132,958, filed on Dec. 31, 2020.

(51) Int. Cl.
*H04B 7/10* (2017.01)
*H01Q 3/26* (2006.01)
*H04B 7/06* (2006.01)
*G01S 13/42* (2006.01)

(52) U.S. Cl.
CPC ............. *H04B 7/10* (2013.01); *G01S 13/42* (2013.01); *H01Q 3/2605* (2013.01); *H04B 7/0617* (2013.01)

(58) Field of Classification Search
CPC ......... H04B 7/10; H04B 7/0617; G01S 13/42; H01Q 3/2605

USPC ........................................................ 342/373
See application file for complete search history.

(56) References Cited

U.S. PATENT DOCUMENTS

| | | | | |
|---|---|---|---|---|
| 2014/0003635 | A1* | 1/2014 | Mohammad | H04R 3/005 381/306 |
| 2018/0026367 | A1* | 1/2018 | Athley | H04B 7/0691 342/373 |

* cited by examiner

*Primary Examiner* — Fitwi Y Hailegiorgis
(74) *Attorney, Agent, or Firm* — Jonathan Gray

(57) ABSTRACT

A radar system includes an antenna array including a plurality of antenna elements; and a transmitter portion coupled to the antenna array, the transmitter portion being configured to sequentially transmit a first transmit beam and a second transmit beam from a single pulse, the first transmit beam and second transmit beam being formed using the same aperture of the antenna array, wherein a skew angle of the first transmit beam is distinct from a skew angle of the second beam. Such radar system alternatively transmitting through subarrays and receiving each via the entire array and combining the signals such that the transmit and receive parts of one of two 2-way beams point in the same direction and the transmit and receive parts of the second 2-way beam point in the same direction and these directions are within a standard beamwidth of each other.

40 Claims, 8 Drawing Sheets

ANGLE DIVERSITY MULTIPLE INPUT MULTIPLE OUTPUT RADAR

CROSS-REFERENCE TO RELATED APPLICATIONS

This application claims priority to U.S. Provisional Patent Application Ser. No. 63/132,958 filed on Dec. 31, 2020, the content of which is relied upon and incorporated herein by reference in its entirety, and the benefit of priority is hereby claimed.

BACKGROUND

"Conventional" Multiple Input Multiple Output (MIMO) radar systems increase the effective aperture of the radar array antenna by transmitting distinguishable (on receive) waveforms from two or more subarrays. The waveforms can be made distinguishable on receive by a number of methods falling within the categories of code division multiple access (CDMA), Doppler division multiple access (DDMA), or time division multiple access (TDMA). With conventional MIMO, the physical array is divided into several subarrays each of which transmits one of the distinguishable waveforms. All signals are received by all elements of the receive array. The signals are separated and recombined coherently. A phased array antenna monostatic radar system, for example, can use one entire aperture for both transmit and receive. (For convenience the following discussions restrict the transmit subarrays to lie within the same aperture as the receive array. This restriction is not essential to the novel concept described here.) The "2-way" signals are combined on receive in a manner that mimics "1-way" signals from an equivalent aperture that is larger than that of the physical array. MIMO introduces considerable flexibility of beamforming within one "dwell." (Of interest here are pulse-Doppler radar systems wherein a measurement is made with multiple pulses comprising a dwell. The data processed within a dwell is done so coherently.) Low sidelobe weighting can be applied in the combining of the 2-way signals (but with correspondingly added loss in signal to noise ratio (SNR).) Also, within the dwell, multiple beams can be formed such as beam pairs for amplitude comparison monopulse or sum-dif monopulse or multiple-beam sector search. The larger equivalent 1-way aperture offers the potential for increased angle estimation but only if the accompanying loss in SNR is not excessive.

A significant source of SNR loss is associated with the broad subarray transmit beam. This SNR loss increases in proportion to the number of transmit subarrays; two subarrays implies 3 dB loss, 4 subarrays, 6 dB, and so forth. The assumption here is that the radar is operating in "track mode," that is, where a measurement is made at a specified look direction only. This loss is much less of an issue in the alternative mode referred to as "search mode" where multiple look directions need to be interrogated. With conventional radar, referred to as Single Input Multiple Output (SIMO), a distinct transmit beam needs to be generated for each look direction. (Typically the direction of the transmit beam is located at the cross over of typically two or four receive beams.) With MIMO in search mode, however, multiple simultaneous beams can be formed with only one dwell. In search, then, the number of dwells needed to cover a field of view with MIMO is less than that of SIMO and thus the MIMO dwell time can be increased over that of SIMO by just the amount needed to equate the SNR between SIMO and MIMO.

To date, the application of MIMO has been to create a 2-way pattern that duplicates a 1-way pattern of increased aperture. However, for angle estimation, the creation, instead, of a pair of skewed 2-way beams (that is, narrow transmit beams as well as narrow receive beams) with one dwell could offer the superior angle estimation accuracy of sequential lobing. With conventional sequential lobing [Radar Handbook Second Edition, M. Skolnik, ed., pg. 20.20, McGraw Hill, 1990], the beams typically occupy successive dwells with a corresponding reduction in measurement rate. Thus two dwells are needed for two such beams. If the dwells are too long, the target could decorrelate between these dwells and if the dwells are too short, Doppler resolution is compromised.

Accordingly, there exists a need in the art for a MIMO architecture that takes advantage of the superior angle estimation accuracy of sequential lobing by creating a pair of skewed 2-way beams that are narrow on transmit as well as narrow on receive and with only one dwell.

SUMMARY

All examples and features mentioned below can be combined in any technically possible way.

According to an aspect, a radar system includes: an antenna array including a plurality of antenna elements; and a transmitter portion coupled to the antenna array, the transmitter portion being configured to transmit a first transmit beam and a second transmit beam such that the first transmit beam and second transmit beam are distinguishable on receive, wherein the first transmit beam and second transmit beam are formed from a single pulse and are formed using an aperture of the antenna array, wherein the first transmit beam is transmitted with a first skew angle and the second transmit beam is transmitted with a second skew angle, the first skew angle and second skew angle being mutually distinct; a receiver portion coupled to the antenna array, the receiver portion being configured to receive from the antenna a first receive signal, the first receive signal being received with the aperture of the antenna array phased to point the first receive signal in a direction of the first skew angle, and to extract from the first receive signal a first receive beam corresponding to the first transmit beam, wherein the receiver portion is further configured to receive from the antenna a second receive signal, the second receive signal being received with the aperture of the antenna array phased to point the second receive signal in a direction of the second skew angle, and to extract from the second receive signal a second receive beam corresponding to the second transmit beam, wherein receiver portion is further configured to estimate an elevation angle of a target according to the first receive beam and the second receive beam.

In an example, the aperture is the entire aperture of the antenna array.

In an example, the separation between the first transmit beam and the second transmit beam is less than or equal to a beamwidth.

In an example, the first transmit beam and the second transmit beam are made distinguishable on receive through at least one of time-division multiple access, code-division multiple access, or doppler-division multiple access.

In an example, the first transmit beam and the second transmit beam are formed with opposing chirp waveforms.

In an example, the first transmit beam and the second transmit beam are encoded as orthogonal phase shift keyed sequences.

In an example, the first receive beam and the second receive beam are extracted according to at least one of time-division multiple access, code-division multiple access, or Doppler-division multiple access.

In an example, the elevation angle of the target is determined according to at least one of amplitude-comparison monopulse, phase-comparison monopulse, or full-vector comparison monopulse.

In an example, the elevation angle of the target is according to maximum likelihood estimation.

In an example, the transmit portion is further configured to transmit a third transmit beam and a fourth transmit beam such that the first transmit beam, the second transmit beam, the third transmit beam, and the fourth transmit beam are distinguishable on receive, wherein the third transmit beam and the fourth transmit beam are formed from the single pulse and using the aperture of the antenna array, wherein the third transmit beam is transmitted with a third skew angle and the fourth transmit beam is transmitted with a fourth skew angle, the third skew angle and fourth skew angle being mutually distinct and being orthogonal to the first skew angle and the second skew angle, such that an azimuth angle of the target is determinable on receive.

According to another aspect, a method for angle diversity multiple input multiple output radar, includes: transmitting, from an antenna array including a plurality of antenna elements, a first transmit beam and a second transmit beam such that the first transmit beam and second transmit beam are distinguishable on receive, wherein the first transmit beam and second transmit beam are formed from a single pulse and are formed using an aperture of the antenna array, wherein the first transmit beam is transmitted with a first skew angle and the second transmit beam is transmitted with a second skew angle, the first skew angle and second skew angle being mutually distinct; receiving, from the antenna array, a first receive signal, the first receive signal being received with the aperture of the antenna array phased to point the first receive signal in a direction of the first skew angle, and a second receive signal being received with the aperture of the antenna array phased to point the second receive signal in a direction of the second skew angle; extracting from the first receive signal a first receive beam corresponding to the first transmit beam and from the second receive signal a second receive beam corresponding the second transmit beam; and estimating an elevation angle of the target according to the first receive beam and the second receive beam.

In an example, the first transmit beam and second transmit beam are formed using the entire aperture of the antenna array.

In an example, the separation between the first transmit beam and the second transmit beam is less than or equal to a beamwidth.

In an example, the first transmit beam and the second transmit beam are made distinguishable on receive through at least one of time-division multiple access, code-division multiple access, or Doppler-division multiple access.

In an example, the first transmit beam and the second transmit beam are formed with opposing chirp waveforms.

In an example, the first transmit beam and the second transmit beam are encoded as orthogonal phase shift keyed sequences.

In an example, the first receive beam and the second receive beam are extracted according to at least one of time-division multiple access, code-division multiple access, or Doppler-division multiple access.

In an example, the elevation angle of the target is determined according to at least one of amplitude-comparison monopulse, phase-comparison monopulse, or full-vector comparison monopulse.

In an example, wherein the elevation angle of the target is according to maximum likelihood estimation.

In an example, the method further includes the steps of: transmitting a third transmit beam and a fourth transmit beam such that the first transmit beam, the second transmit beam, the third transmit beam, and the fourth transmit beam are distinguishable on receive, wherein the third transmit beam and the fourth transmit beam are formed from the single pulse and using the aperture of the antenna array, wherein the third transmit beam is transmitted with a third skew angle and the fourth transmit beam is transmitted with a fourth skew angle, wherein the third skew angle and fourth skew angle are mutually distinct and are orthogonal to the first skew angle and the second skew angle, such that an azimuth angle of the target is determinable on receive.

According to another aspect, a radar system includes: an antenna array including a plurality of antenna elements; a transmitter portion coupled to the antenna array, the transmitter portion being configured to transmit a first transmit beam from a first subarray of the antenna array and to transmit a second transmit beam from a second subarray of the antenna array, wherein the first subarray and the second subarray are mutually distinct, wherein the first transmit beam and the second transmit beam are directed toward boresight of the antenna; and a receiver portion coupled to the antenna array, the receiver portion being configured to receive from the antenna a first receive signal, the first receive signal being received with an aperture of the antenna array phased to point the first receive signal in a direction of a first skew angle, and configured to receive from the antenna a second receive signal, the second receive signal being received with the aperture of the antenna array phased to point the second receive signal in a direction of the second skew angle; the receiver portion being further configured to extract from the first receive signal a first receive beam corresponding to the first transmit beam and a second receive beam corresponding to the second transmit beam and to extract from the second receive signal a third receive beam corresponding to the first transmit beam and a fourth receive beam corresponding the second transmit beam, wherein the receiver portion is further configured to combine the first receive beam with the second receive beam to form a first combined beam in direction of the first skew angle and to combine the third receive beam with the fourth receive beam to form a second combined beam in direction of the second skew angle, and to estimate an elevation angle of a target according to the first combined beam and the second combined beam.

In an example, the aperture is the entire aperture of the antenna array.

In an example, the first receive beam and the second receive beam are separated from the third receive beam and the fourth receive beam by less than or equal to a standard beamwidth.

In an example, the first transmit beam and the second transmit beam are made distinguishable on receive through at least one of time-division multiple access, code-division multiple access, or doppler-division multiple access.

In an example, the first transmit beam and the second transmit beam are formed with opposing chirp waveforms.

In an example, the first transmit beam and the second transmit beam are encoded as orthogonal phase shift keyed sequences.

In an example, the first receive beam, second receive beam, third receive beam, and the fourth receive beam are extracted according to at least one of time-division multiple access, code-division multiple access, or Doppler-division multiple access.

In an example, the elevation angle of the target is determined according to at least one of amplitude-comparison monopulse, phase-comparison monopulse, or full-vector comparison monopulse.

In an example, the elevation angle of the target is according to maximum likelihood estimation.

In an example, the transmit portion is further configured to transmit a third transmit beam from a third subarray and a fourth transmit beam from a fourth subarray, such that the first transmit beam, the second transmit beam, the third transmit beam, and the fourth transmit beam are distinguishable on receive, wherein the third transmit beam is transmitted with a third skew angle and the fourth transmit beam is transmitted with a fourth skew angle, the third skew angle and fourth skew angle being mutually distinct and being orthogonal to the first skew angle and the second skew angle, such that an azimuth angle of the target is determinable on receive.

According to another aspect, a method for angle diversity multiple input multiple output radar, includes the steps of: transmitting, from an antenna array including a plurality of antenna elements, a first transmit beam from a first subarray of the antenna array and a second transmit beam from a second subarray of the antenna array, wherein the subarray and the second subarray are mutually distinct, wherein the first transmit beam and the second transmit beam are directed toward boresight of the antenna; and receiving, from the antenna array, a first receive signal, the first receive signal being received with an aperture of the antenna array phased to point the first receive signal in a direction of a first skew angle, and a second receive signal, the second receive signal being received with the aperture of the antenna array phased to point the second receive signal in a direction of the second skew angle; extracting from the first receive signal a first receive beam corresponding to the first transmit beam and a second receive beam corresponding to the second transmit beam and from the second receive signal a third receive beam corresponding to the first transmit beam and a fourth receive beam corresponding the second transmit beam; combining the first receive beam with the second receive beam to form a first combined beam in direction of the first skew angle and the third receive beam with the fourth receive beam to form a second combined beam in direction of the second skew angle; estimating an elevation angle of the target according to the first combined beam and the second combined beam.

In an example, the aperture is the entire aperture of the antenna array.

In an example, the first receive beam and the second receive beam are separated from the third receive beam and the fourth receive beam by less than or equal to a standard beamwidth.

In an example, the first transmit beam and the second transmit beam are made distinguishable on receive through at least one of time-division multiple access, code-division multiple access, or doppler-division multiple access.

In an example, the first transmit beam and the second transmit beam are formed with opposing chirp waveforms.

In an example, the first transmit beam and the second transmit beam are encoded as orthogonal phase shift keyed sequences.

In an example, the first receive beam, second receive beam, third receive beam, and the fourth receive beam are extracted according to at least one of time-division multiple access, code-division multiple access, or Doppler-division multiple access.

In an example, the elevation angle of the target is determined according to at least one of amplitude-comparison monopulse, phase-comparison monopulse, or full-vector comparison monopulse.

In an example, the elevation angle of the target is according to maximum likelihood estimation.

In an example, the method further includes the steps of: transmitting a third transmit beam from a third subarray and a fourth transmit beam from a fourth subarray, such that the first transmit beam, the second transmit beam, the third transmit beam, and the fourth transmit beam are distinguishable on receive, wherein the third transmit beam is transmitted with a third skew angle and the fourth transmit beam is transmitted with a fourth skew angle, the third skew angle and fourth skew angle being mutually distinct and being orthogonal to the first skew angle and the second skew angle, such that an azimuth angle of the target is determinable on receive.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Figure 1:
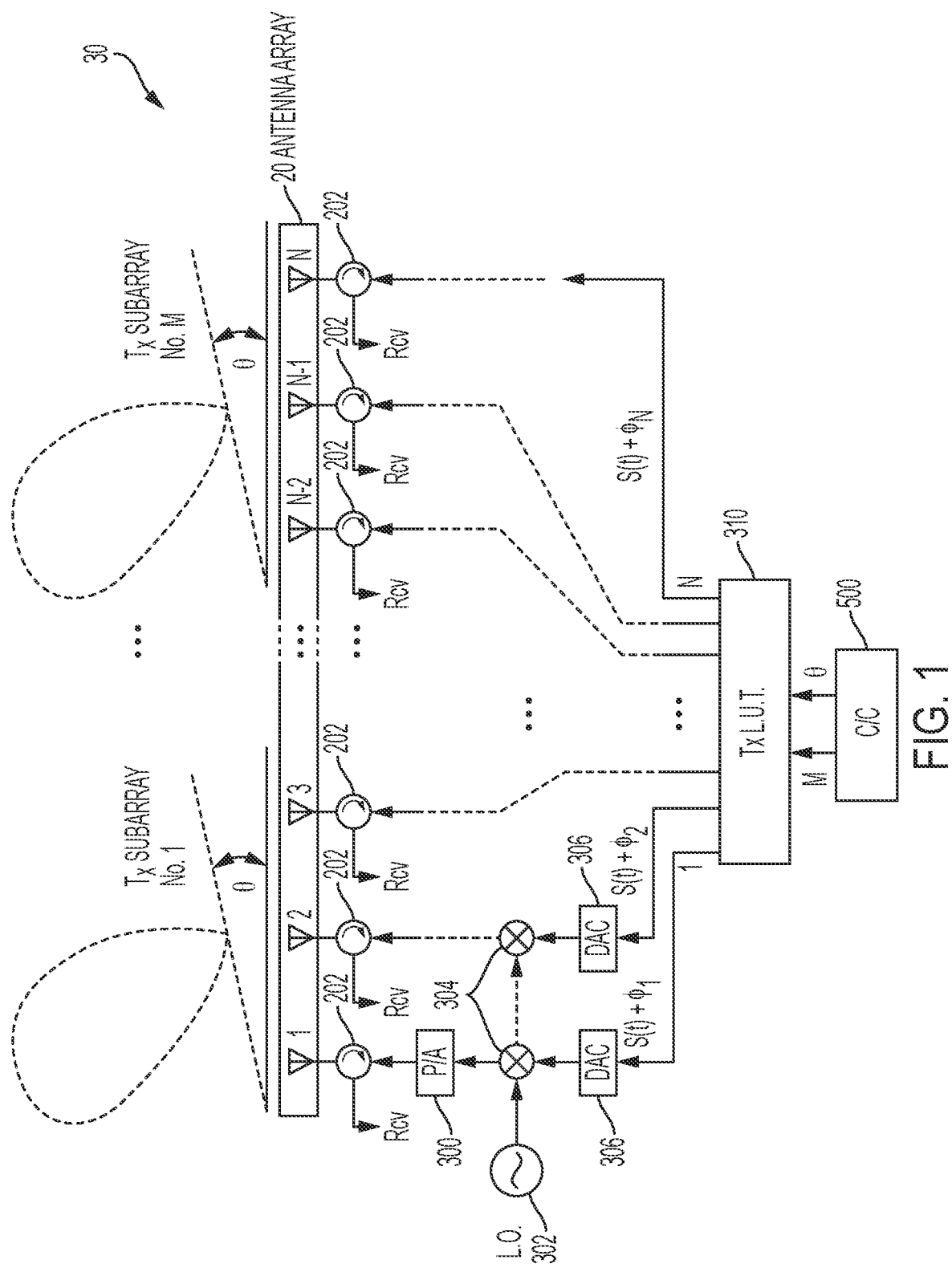
FIG. 1 depicts a block diagram of the transmit portion of an angle diversity MIMO radar system according to an example.

Various examples detailed in this disclosure describe two variants of angle diversity MIMO (ADMIMO) referred to as ADMIMO Track Mode and as ADMIMO Search Mode, which both take advantage of the superior angle estimation accuracy of sequential lobing but without the requirement for a multiple dwell per measurement. It should be understood that the terms ADMIMO Track Mode and ADMIMO Search Mode are used, these terms relate to the natural applications of these modes, but are not otherwise limiting. Thus, in alternate examples, ADMIMO Track Mode can be used in a search mode (where multiple look directions are interrogated) and ADMIMO Search Mode can be used in a track mode (where a measurement is made at a specified look direction only).

In various examples described, the ADMIMO Track Mode radar forms two (or four if two dimensional angle estimation is sought) 2-way skewed beams. The transmit and receive beam patterns of each 2-way beam overlap. The beams are steered with respect to each other as in sequential lobing to result in two (or four) skewed 2-way beams separated by less than a standard beamwidth. Each beam is formed using the same aperture (which optimally is the entire aperture of the antenna array) and, for uniform weighting, results in the minimum "2-way beamwidth." Further, for distinguishing on receive the transmit parts of the two (or four) 2-way beams, they can share a pulse, as in time-division multiple access ("TDMA"). Alternatively they can be distinguished via code-division multiple access ("CDMA") or Doppler-division multiple access ("DDMA"), or some combination of these methods. This is to say that the transmit beams can be made distinguishable on receive according to time, coding, or frequency. In the TDMA two 2-way beam example, the first half the pulse can be applied to one beam and second half to the other beam. In the 4-beam example, a quarter of the pulse can be applied to each beam. In the CMDA and DDMA examples, the beams can be transmitted simultaneously and are made distinguishable through encoding or frequency. The pulse sharing implies a 3 dB (or 6 dB for four beams) loss in SNR, but this is the only MIMO SNR loss and otherwise ADMIMO Track Mode yields an optimal MIMO angle accuracy.

The ADMIMO Search Mode variant avoids this SNR loss resulting in best overall performance, as described below. Consider the two 2-way beam case. The four 2-way beam case follows basically the same structure.) In ADMIMO Search Mode, the antenna array is sub-arrayed on transmit, the subarray signals being made distinguishable through TDMA, CDMA, DDMA, or some combination thereof. Each transmitted sub array signal is received by the entire array scanned to form two narrow receive beams, one for each transmit subarray, separated less than a standard beamwidth. These signals in turn are linearly combined to result in two 2-way narrow "transmit" beams separated by less than a standard beamwidth such that both the transmit and receive parts of the 2-way beams point in the same directions. Because of the broad patterns of the transmit subarrays, the subarrayed signals can be used to process two adjacent look directions with only one set of subarray transmissions, and thus the transmit time can be doubled, resulting in a 3 dB gain in SNR that just offsets the 3 dB SNR loss experienced by ADMIMO Track Mode.

In both ADMIMO Track Mode and ADMIMO Search Mode, the resulting signals can be used to determine the elevation angle of the target using suitable angle estimation methods such as amplitude-comparison monopulse, phase-comparison monopulse, vector-comparison monopulse, or maximum likelihood estimation (MLE), although it will be understood that other estimation methods can be employed as well.

Figure 2:
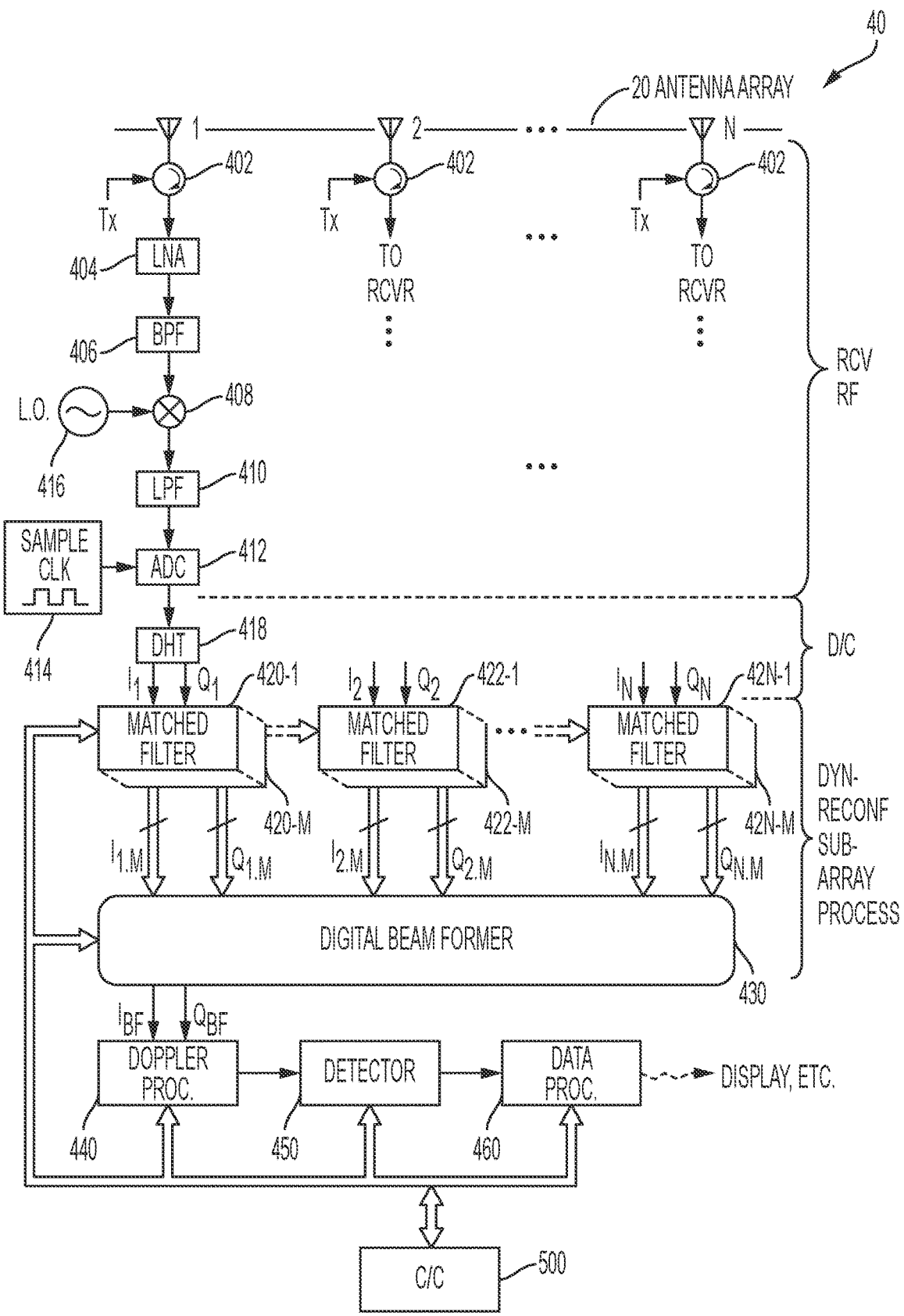
FIG. 2 depicts a block diagram of the receive portion of an angle diversity MIMO radar system according to an example.

Turning now to FIGS. 1 and 2, there is shown an example radar system that can be employed for either ADMIMO Track Mode or ADMIMO Search Mode. It should, however, be understood that the below-described radar system constitutes only one possible example of a radar system that may be used. Indeed, it will be appreciated by one of ordinary skill in the art, in conjunction with a review of this disclosure, that any radar system suitable for implementing the processes, methods, and algorithms described herein can be used.

In FIG. 1, a block diagram of a transmitter portion 30 of a radar system in accordance with an example of the present invention is disclosed. In this example, the transmitter portion 30 is coupled to a phased array antenna 20 having antenna elements 1-N in the antenna array, N being an integer value. The antenna elements may, for example, be separated by a distance substantially equal to $\lambda/2$, where $\lambda$ is the wavelength associated with carrier frequency of the transmitted beam (although other separations are possible). Antenna elements 1-N in phased array antenna 20 may be arranged using a linear phased array, a rectangular phased array, a planar array, or any other suitable geometric phased array of antenna elements.

In general, command/control portion 500 of radar system 10 is configured to dynamically configure the system according to situational demands. Command/control circuit 500 provides, for example, a look-up-table (LUT) 310 with the desired transmit waveforms. LUT 310 provides the appropriate set of M transmit waveforms for each antenna element (1-N) in response. Each of the M-predetermined signals is directed to a corresponding digital to analog converter (DAC) 306. The analog baseband signal is upconverted by mixer 304. The local oscillator 302 provides the mixer 304 with the appropriate RF frequency. The mixer modulates the baseband signal and the RF signal is amplified by power amplifier 300. The amplified RF signal is directed to its corresponding antenna element (1-N) via circulator 202.

As described above, the ADMIMO Track Mode variant, transmit portion 30 and antenna array 20 transmits two or four transmit beams from a single pulse. In this example, command/control circuit 500 can provide look-up-table (LUT) 310 with the desired angular offset (0) of the transmitted wavefront for each beam. LUT 310 provides the appropriate set of M transmit waveforms for each antenna element (1-N) in response to receiving any value of 0. As a result, antenna array 20 generates the two or four beams from a single pulse, each of which is characterized by a predetermined beamwidth and a predetermined angular wavefront offset (0). In the two-beam example, each beam can be respectively skewed $\Delta u=-\Delta$ and $\Delta u=\Delta$ with respect to boresight $u=u_0$. In the four-beam example, the additional two transmit beams are skewed in directions otherogonal to $\Delta u=-\Delta$ and $\Delta u=\Delta$, such that azimuth angle can additionally be determined on receive. The crossover of the beams occurs at boresight.

In an example, the antenna elements are phased such that the transmit array patterns can be given by:

$$b_1 = E_t(u) \sum_{n=1}^{N_r} e^{j\beta D\tilde{m}(u-\Delta)}$$

$$b_2 = E_t(u) \sum_{n=1}^{N_r} e^{j\beta D\tilde{m}(u+\Delta)}$$

where the receive array contains $N_r$ elements, the transmit array also contains the $N_r$ total elements (Note that for ADMIMO Search Mode, a distinguishable waveform is transmitted between M subarrays. The subarrays are assumed to fill the entire array such that $N_r/M$ is an integer, although the subarrays generally can overlap as described below.) The transmit waveforms can be made distinguishable on receive through TDMA, CDMA, DDMA, or some combination thereof.

In the TDMA example, because the beams share a pulse, the first half of the pulse can be used for the first beam and the second half of the pulse for the second beam. In the 4-beam example, as described above, beams can be skewed in azimuth and in elevation with respect to boresight. Similar to the 2-beam example, each of the four beams can be sequentially generated from a quarter of the pulse. In either the two-beam or four-beam example, each beam is transmitted using the same aperture, which, optimally, is the entire aperture of the antenna 20.

In an example, the TDMA beams are transmitted without encoding, which is possible because the beams share a pulse. In an alternative example, CDMA encoding can be applied to the TDMA example to improve further the separation of the waveforms with the advantage that, because the method is limited to two (or, for example, four) waveforms, these can easily be made nearly perfectly orthogonal.

In the CDMA example, encoding can be applied to make the beams distinguishable on receive. Because the method is limited to two (or, possibly, four) waveforms, these can easily be made nearly perfectly orthogonal. Such encoding can take the form of orthogonal phase shift keyed sequences. Or, more simply for the two beam case, reverse slope (up-down) chirp waveforms can be employed. It should, however, be understood that any suitable encoding can be applied, and frequency encoding can be applied as well (as in DDMA).

As will be described further below, each transmitter signal is received by all elements and the two skewed transmit beams (or two subarray transmit beams if Search Mode) are assumed to be perfectly distinguished through time-delay matching or correlation, etc., upon reception. From this data, two skewed 2-way beams are formed, one beam skewed in sine angle $-\Delta$, the other $+\Delta$. For general skew $u\Delta$, the 2-way beam is the product of the skewed transmit array beam and skewed receive array beam. Further, in the above equations:

$$\hat{m} = m - \frac{N_t + 1}{2}$$

$$D \stackrel{def}{=} \text{transmit subarray spacing}$$

In addition, D is restricted to $D = N_{rM} d$ where $N_{rM}$ is assumed to be an integer given by $$N_{rM} = \frac{N_r}{M}$$

and Et(u) denotes the subarray pattern.

The unique MIMO methods introduced here form two 2-way squinted beams for 1-dimensional angle estimation (or four such beams if both azimuth and elevation angle estimation is sought). With ADMIMO Track Mode, the corresponding transmit and receive beams completely overlap. This has the advantage of ensuring 27 dB sidelobe 2-way beams for uniform weighting.

On the other hand, in ADMIMO Search Mode as indicated above, multiple subarrays are formed on transmit, as in typical MIMO, and transmits the subarray beams such that the subarray signals are distinguishable on receive. Thus, command/control portion 500 of radar system 10 is configured to dynamically reconfigure the system 10 to include M transmit subarrays, where M is an integer value. More specifically, in the two-beam example, two transmit subarrays are formed, and in the four-beam example, four transmit subarrays are formed. Command/control circuit 500 provides, in an example, LUT 310 with the number of desired subarrays. LUT 310 provides the appropriate set of N transmit waveforms for each antenna element (1-N) in response to receiving any value of M. Each transmit subarray coherently generates a single beam that includes one of M orthogonal signals (made orthogonal through, e.g., TDMA, CMDA, or DDMA).

Figure 3:
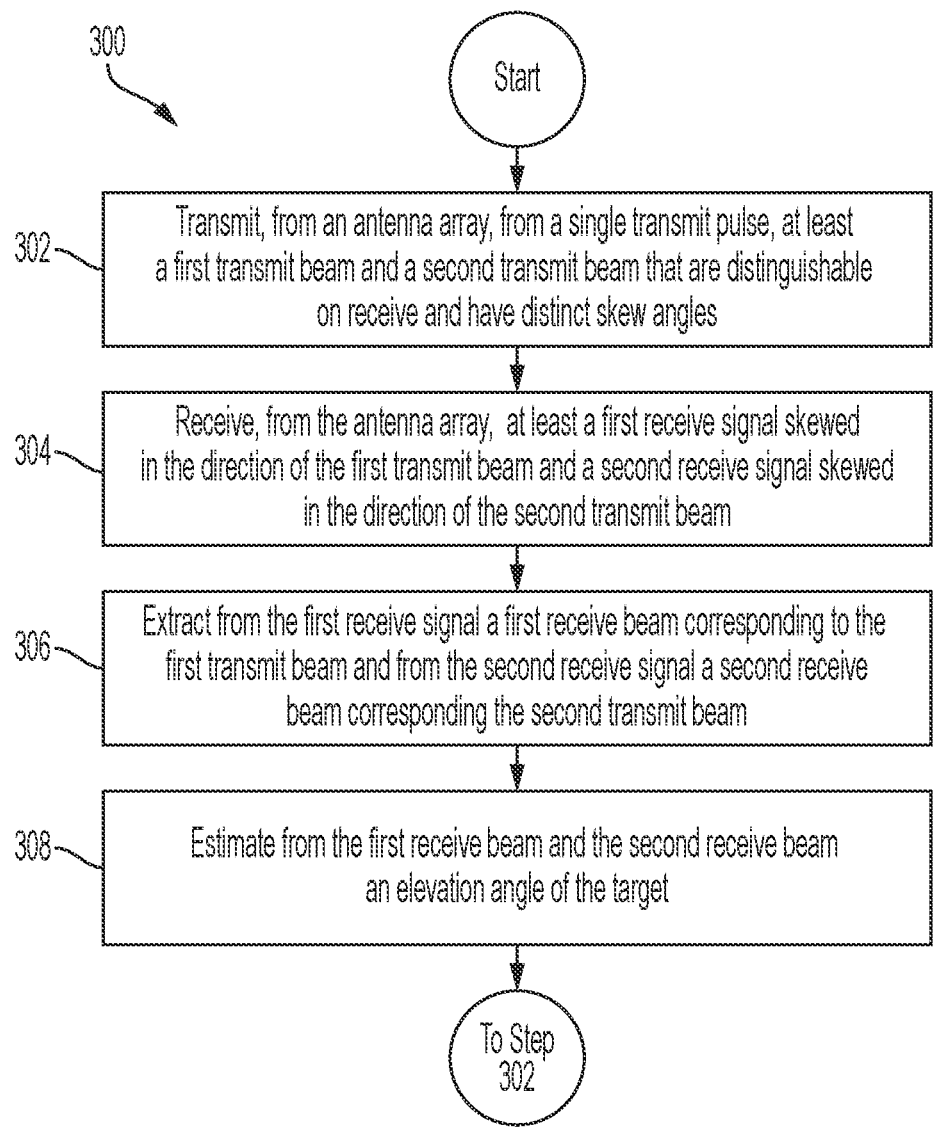
FIG. 3 depicts a flowchart of a method for angle diversity MIMO track mode radar system according to an example.

As embodied herein and depicted in FIG. 3, a block diagram of a receiver portion of a radar system in accordance with the embodiment depicted in FIG. 2 is disclosed. Thus, the antenna 20 includes antenna elements 1-N. As before, the antenna element 1 is connected to, for example, circulator device 202. (In an alternate example, an RF switch may be used instead of a circulator.) Signals are received, having been reflected by a target or other structure, at the antenna elements 1-N.

The received signals are directed to low noise amplifier 404. The amplified received signal is then directed to bandpass filter 406. The filtered RF signal is down converted by mixer 408 whereby the filtered RF signal is multiplied by an appropriate signal provided by local oscillator 416. The down converted signal is directed to low pass filter 410 which removes unwanted harmonics from the received analog baseband signal. Next, the analog signal is converted into a baseband digital signal by analog-to-digital converter (ADC) 412. ADC 412 provides discrete digital samples of the received signal in accordance with the sampling clock 414.

Those of ordinary skill in the art will understand the same operations described above relative to the first receive channel are also being performed in parallel by receive channels 2-N. Thus, there are N digital baseband samples being generated during every sampling clock period. It should also be mentioned at this point that all timing components such as clocks and oscillators in both the transmitter and receiver are derived from the same timing source such that system 10 is phase coherent.

Each digital baseband signal is directed into a digital Hilbert transform, which is typically implemented in software. As those of ordinary skill in the art will appreciate, the Hilbert transform is employed to shift a given signal by +/−90 degrees. Thus, the output of DHT 418 provides the in-phase component i[n] and the quadrature component q[n] for a given signal sample r[n]. Thus, a quadrature version of the signal sample r[n] is provided to the matched filter 420 in the rectangular form r[n]=i[n]+jq[n]. Those skilled in the art will understand that the quadrature signal may also be expressed as r[n]=M exp (jφ), where M is the square root of the sum of the square of i[n] and q[n]. This is mentioned because the quadrature signals i[n] and q[n] provide important phase information that is utilized in both the matched filters and the beam former 430.

To the extent that the beams are encoded at transmit, a set of matched filters 420-1-42N-1, extracts the encoded beams on receive from the quadrature signals [i] and q[n] provided. The matched filter bank for channel one (1) is shown to include matched filters [420-1, 420-2 . . . 420-M]. Thus, when the command/control portion 500 provides LUT 310 (see FIG. 2) with parameter M, it also dynamically reconfigures the receiver 40 by providing a predetermined orthogonal transmit signal to matched filter 420-1, a second predetermined orthogonal transmit signal to matched filter 420-2, and so on and so forth. (These filters can also be set a priori if the encoding is not dynamically changed.) Thus, the matched filter bank for every channel (1-N) must include a matched filter for each one of the M-orthogonal signals. As those of ordinary skill in the art will appreciate, a matched filter performs a cross-correlation of the orthogonal signal and the received signal sample. If a time delayed and attenuated version of the orthogonal signal is present in the received signal, the matched filter output is at a maximum. If a time delayed and attenuated version of the orthogonal signal is not present in the received signal, the cross-correlation yields a smaller value (e.g., there is noise in the received signal). In particular, if a signal is present, there is a matched filter gain of (pulse width)×(bandwidth) out of the matched filter. Thus, e.g., a 10 microsecond pulse having a 20 MHz bandwidth will receive 23 dB more gain out of the matched filter than a random noise signal. As shown in the drawing, the matched filter bank for each channel (1-N) will provide an in-phase vector I(1-N), M and a quadrature-phase vector Q (1-N), M based on the received signals provided by antenna elements 1-N.

The matched filter banks described above employ code orthogonal waveforms, i.e., intrapulse coding, but the present invention should not be construed as being limited to this method. As described above, the main ways to achieve orthogonality are through intrapulse time, frequency, and Doppler coding. In intrapulse coding, the waveforms are orthogonally coded such that they may be identified by the matched filter. If frequency orthogonal waveforms are employed (that is transmitting each waveform at a different RF frequency), the signal identification being done somewhere other than the matched filter, e.g., by using a bank of multiple DHT filters. This method would reduce the bandwidth through the processing chain by not requiring the full radiated bandwidth (including all multiple frequency orthogonal waveforms) to be processed by the matched filter. Thus, with each beam transmitting at a different RF frequency, the receiver is open (from a bandwidth perspective) to receive contributions from all transmitted waveforms. In this method, the waveforms are separated out either at the DHT or by the matched filter and then processed in the beam former. This method typically requires a beam former process that is slightly more complicated. If Doppler coding is employed, the processing will likely occur within the Doppler processor 440.

If TDMA is employed, because the beams are sequentially transmitted, the target returns from each beam can be distinguished by applying an appropriate delay. For example, once the return signal is received, each beam can be distinguished according to the length of time that each beam was transmitted. Thus, if the first transmit beam was transmitted for a time interval $t_1$ of a pulse and the second transmit beam was transmitted for a time interval $t_2$ of the same pulse, then first transmit beam can be distinguished as the first $t_1$ length portion of the received beam and the second transmit beam can be distinguished as the second $t_2$ length portion of the received beam.

In the next processing step, the digital beam former 430 will receive N-I and Q vectors from the N matched filter banks, N being an integer. The digital beam former 430 is configured to multiply each in-phase and quadrature pair with a complex weighting function. The weighted in-phase and quadrature pairs are summed to form an output signal. More specifically, if we have $N_r$ elements in receive array, and we transmitted M orthogonal waveforms, we have $N_r$ times M matched filters.

For purposes of simulation (in an operational system the receive patterns as well as transmit patterns typically are measured), the receive array patterns can be given by:

$$a_1 = \sum_{n=1}^{N_r} e^{j\beta d \hat{n}(u-\Delta)}$$

$$a_2 = \sum_{n=1}^{N_r} e^{j\beta d \hat{n}(u+\Delta)}$$

where $$\hat{n} = n - \frac{N_r+1}{2}$$

$d \stackrel{def}{=}$ interelement spacing $$\beta = \frac{2\pi}{\lambda}\lambda$$

$\lambda \stackrel{def}{=}$ wavelength

In forming the steering vector, s, note that a scalar coefficient of s divides out in the expression for $\hat{Q}$. Thus, the subarray pattern can be dropped in the expression for s which then becomes $$s=[a_1 b_1 \ a_2 b_2]^t$$

where the t superscript denotes "transpose." This expression for s can be substituted into $\hat{Q}$ and the MLE computed from the expression above. The requisite derivatives are straight forward although messy.

The digital beam former 430 outputs in-phase and quadrature data for each weighted beam (if weighting other than uniform is desired) of $r_n$ to the Doppler processor 440. Doppler processor 440 uses the input samples from the beam former 430 to generate target range rate measurements for each weighted beam pattern of $r_n$ and provides coherent gain by integrating returns over multiple pulses.

For ADMIMO Track Mode, the transmit signal of beam pattern skewed $\Delta u=-\Delta$ is received with an antenna pattern skewed (i.e., phased) $\Delta u=-\Delta$; similarly, the transmit signal or beam pattern skewed $\Delta u=-\Delta$ is received with an antenna pattern skewed $\Delta u=\Delta$. In the 4-beam example, the beams are likewise received with antenna patterns skewed in azimuth. Because the ADMIMO Track Mode beams share a pulse, the power to each is half that in SIMO. The pulse sharing implies a 3 dB loss in SNR. But this is the only MIMO SNR loss and thus ADMIMO Track Mode yields the optimal angle accuracy for MIMO "track mode." The variant MIMO-Search Mode method (with subarrayed aperture) would divide the transmit aperture in half, one half for each of two MIMO waveforms, and avoiding the 3 dB SNR loss by forming the 2-way beams via processing for the current and adjacent dwell positions.

As described above, the pulse on transmit can be divided into four, rather than two transmit beams. This permits two-dimensional angle estimation with two dimensional arrays (or with three dimensional conformal arrays) by doubling the number of beams sharing a pulse, but with an associated additional 3 dB SNR loss for ADMIMO Track Mode (but not for the variant MIMO-Search Mode).

For ADMIMO Search Mode, the receive beams for each subarray signal are that of the full array steered to the squinted beam positions. Thus, in the two subarray example, the first transmit subarray signal is received with an antenna pattern with two skew directions $\Delta u=-\Delta$ and $\Delta u=\Delta$, producing two separate skewed beams. Likewise, the second transmit subarray signal is received with the same skewed antenna pattern, producing two separate skewed beams. This results in four beams, two skewed $\Delta u=-\Delta$ (one beam from the first subarray waveform and one beam from the second subarray waveform) and two skewed $\Delta u=\Delta$ (one beam from the first subarray waveform and one beam from the second subarray waveform). These 2-way beams corresponding to the subarrays are linearly combined to point in the squinted beam positions. In other words, the two beams skewed $\Delta u=-\Delta$ are linearly combined and the two beams skewed $\Delta u=\Delta$ are linearly combined. The result is that the 2-way subarray beams peak in the squinted beam positions. The effect is that of the subarray patterns combined via array factors steered to the squinted beam positions. One disadvantage of this architecture is that the transmit beams exhibit high near-in sidelobes. However, a major advantage of this architecture is that the two (or more) 2-way beams are formed digitally on receive, and because of the large beamwidth of the subarray pattern, an adjacent dwell position can be processed without transmitting a new set of data. Thus in search mode two dwell positions, for example, can be processed with twice the dwell length as required by SIMO in search mode. The result is an equivalent reduction in SNR loss, by a factor of 3 dB for the two-dwell position localized search.

Similar to ADMIMO Track Mode, in ADMIMO Search Mode, two more subarray signals can be transmitted with mutually distinct skew angles orthogonal to $\Delta u=\Delta$ and $\Delta u=-\Delta$ in order to permit estimating azimuth angle of the target on receive. Thus, on receive, the third transmit subarray signal is received with an antenna pattern with two skew directions $\Delta u=-\Delta$ and $\Delta u=\Delta$, producing two separate skewed beams. Likewise, the fourth transmit subarray signal is received with the same skewed antenna pattern, producing two separate skewed beams. These 2-way beams corresponding to the subarrays are linearly combined to point in the squinted beam positions.

In both ADMIMO Track Mode and ADMIMO Search Mode, the two (or more) resulting 2-way skewed beams are input to a detector 450 that estimates at least one dimension of the position of the target. That at least one dimension is typically an elevation angle, although in certain examples azimuth can also be found. Detector 450 can perform angle estimation with sequential lobing accuracy, but where the angle is estimated with only one dwell. Stated concretely, the complex MIMO beams can be found, for example, with a monopulse angle estimation table (e.g., for amplitude-comparison monopulse, phase-comparison monopulse, or full vector monopulse) or in a Maximum Likelihood Estimation processor. (It should, however, be understood that any suitable angle estimation method can be used.)

In the monopulse angle estimation example, an angle estimation table is typically used to compare one or both of amplitude and phase of the signals output from Doppler processor 440 to determine elevation and/or azimuth.

The estimated angle of the target using the Maximum Likelihood Estimation can be defined as follows: Consider only receiver noise interference and equal noise variance (power) in all receive channels. Let z denote a data vector. This vector contains signal plus noise. Normalize z to unity variance noise. Then the expected value of z is given by $$E\{z\}=bs$$

where b denotes the signal strength normalized by noise and s denotes the "steering vector," and where the SNR per receive channel is given by $E\{|b|^2\}$. In this example, the steering vector is a function of signal angle of arrival, specifically the sine angle, u. The Maximum Likelihood estimate of angle u is found by maximizing $$\hat{Q} = \frac{z^H s s^H z}{s^H s}$$

where the H superscript denotes "conjugate transpose" (or Hermitian). Expanding Q in a Taylor series about the beam direction $u_0$ and retaining the first three terms results in the maximum likelihood estimate of u given by $$u = u_0 - \left(\frac{\partial^2 \hat{Q}(u_0)}{\partial u^2}\right)^{-1} \frac{\partial \hat{Q}(u_0)}{\partial u}$$

In practice, in the MLE example, the two or four 2-way beam signals are combined with an appropriate steering vector (constructed from knowledge of the transmit and receive antenna patterns) in computing a log-likelihood value. The process is repeated for all steering vectors corresponding to target angles within a specified field of view. The angles corresponding to the maximum log-likelihood value is taken as the angles of the target.

Referring now to FIG. 3, there is a shown a flowchart of a method 300 for ADMIMO Track Mode. The steps of method 300 can be performed by any suitable radar system, such as the radar system formed by transmitter portion 30 and receiver portion 40 described above. In an example, various steps of method 300 can be performed in software or hardware, or some combination of software and hardware. To the extent that certain steps are performed in software, the relevant steps can be stored in a non-transitory storage medium and can be executed by a suitable processor or combination of processors.

At step 302, a first transmit beam and a second transmit beam are transmitted from the same aperture of an antenna array, using a single pulse. The first transmit beam is transmitted with at skew angle $\Delta u=\Delta$ and the second transmit beam is transmitted at skew angle $\Delta u=-\Delta$. The first transmit beam and second transmit beam are made distinguishable on receive by transmitting with at least one of TDMA, CDMA, or DDMA. In the case of CDMA, for example, the first transmit beam and second transmit beam can transmitted with opposing chirp waveforms (i.e., up/down) or with orthogonal phase-shift keyed sequences. Preferably, the first transmit beam and the second transmit beam are separated by less than standard beamwidth. Further, the first transmit beam and the second transmit are both preferably transmitted from the full aperture of the antenna array.

Additionally, at least two more transmit beams (i.e., a third and fourth transmit beam) can be formed from the same pulse. The additional transmit beams are transmitted with distinct skew angles that are othorgonal to skew angle $\Delta u=\Delta$ and skew angle $\Delta u=\Delta$. This permits two-dimensional angle estimation with two dimensional arrays (or with three dimensional conformal arrays) by doubling the number of beams sharing a pulse, but with an associated additional 3 dB SNR loss at least for ADMIMO Track Mode.

At step 304, at least a first receive signal skewed in the direction of the first transmit beam (by appropriately phasing the antenna array), i.e., $\Delta u=\Delta$, and a second receive signal skewed in the direction of the second transmit beam, i.e., $\Delta u=-\Delta$, are received from the antenna array. The first receive signal and second receive signal can be received at the same aperture from which the first transmit beam and the second transmit beam are transmitted.

To the extent that third and fourth transmit beams are transmitted in step 302, step 304 can further include the steps of appropriately phasing the antenna array to receive a third receive signal skewed in the direction of the third transmit beam and phasing the antenna array to receive a fourth receive signal skewed in the direction of the fourth transmit beam.

At step 306, a first receive beam corresponding to the first transmit beam is extracted from the first receive signal and a second receive beam corresponding to the second transmit beam is extracted from the second receive signal. The first receive beam and second receive beam are extracted according to TDMA, CDMA, and/or DDMA, depending on the method that the first and second transmit beams were transmitted. Generally speaking, the step of extracting refers to isolating the components of first receive signal that are correlated to the first transmit beam and isolating the components of the second receive signal that are correlated to the second transmit beam.

To the extent that third and fourth transmit beams are transmitted in step 302, step 306 can further include the steps of extracting a third receive beam corresponding to the third transmit beam and a fourth receive beam corresponding to the fourth transmit beam. The third receive beam and fourth receive beam are extracted according to TDMA, CDMA, and/or DDMA, depending on the method that the third and fourth transmit beams were transmitted.

At step 308, an elevation angle of the target is estimated according to the first receive beam and the second receive beam. In an example, the elevation angle of the target can be estimated according to amplitude-comparison monopulse, phase-comparison monopulse, or full-vector comparison monopulse. These methods can be implemented through a look-up table, and are understood in the art. Alternatively, the elevation angle of the target can be estimated according through maximum likelihood estimation. This can implemented through a set of matched filters, as will be understood by a person of ordinary skill in the art. It should further be understood that other methods can elevation angle estimation according to the first and second receive beam can be employed.

To the extent that third and fourth transmit beams are transmitted in step 302, step 308 can further comprise estimating, according to the third and fourth transmit beams, an azimuth angle of the target. This can likewise be performed through amplitude-comparison monopulse, phase-comparison monopulse, full-vector comparison monopulse, maximum likelihood estimation, or any other suitable angle estimation method.

Figure 4:
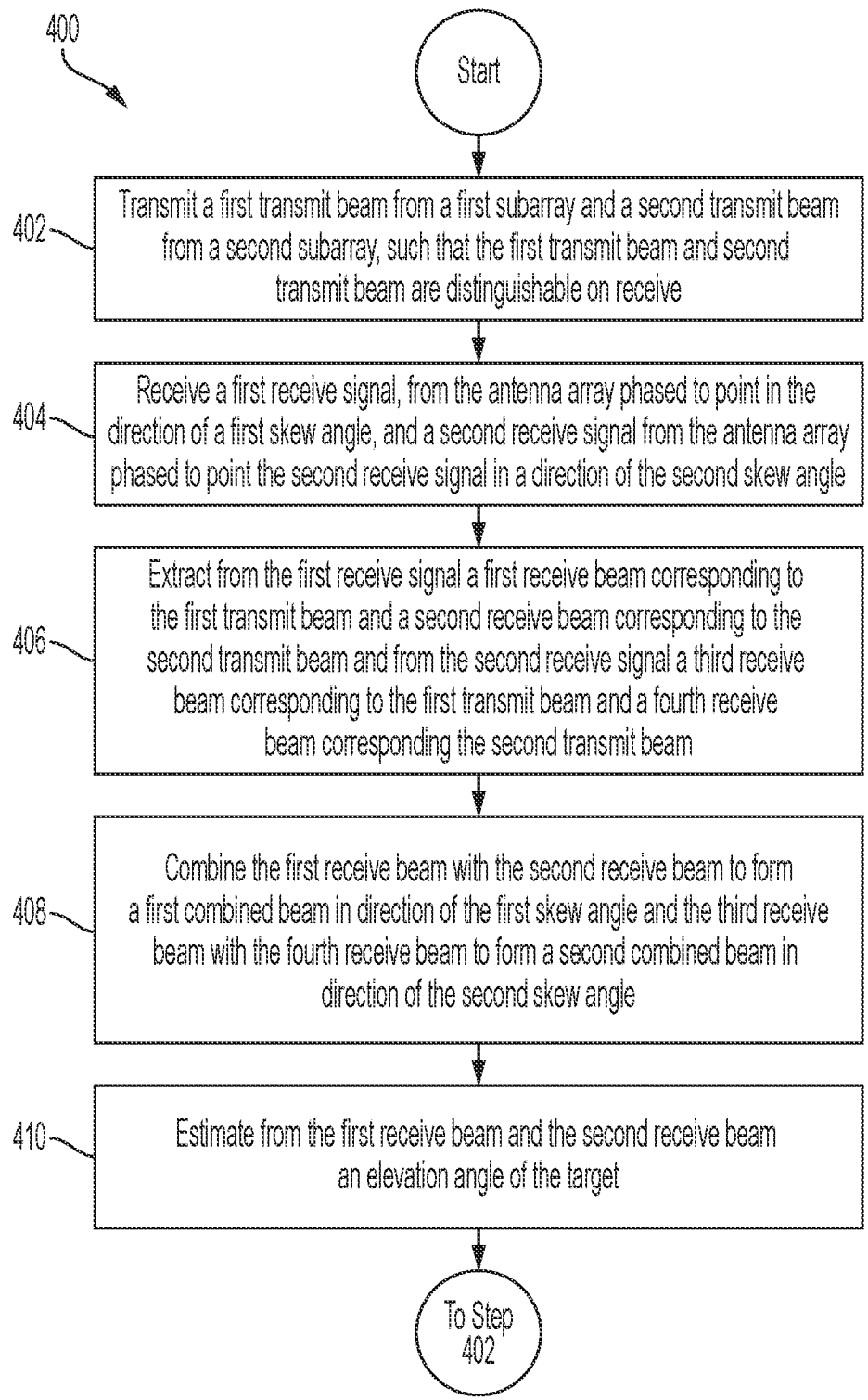
FIG. 4 depicts a flowchart of a method for angle diversity MIMO search mode radar system according to an example.

Referring now to FIG. 4, there is a shown a flowchart of a method 400 for ADMIMO Search Mode. The steps of method 400 can be performed by any suitable radar system, such as the radar system formed by transmitter portion 30 and receiver portion 40 described above. In an example, various steps of method 400 can be performed in software or hardware, or some combination of software and hardware. To the extent that certain steps are performed in software, the relevant steps can be stored in a non-transitory storage medium and can be executed by a suitable processor or combination of processors.

At step 402, a first transmit beam is transmitted from a first subarray and a second transmit beam is transmitted from a second subarray of an antenna array. Generally speaking, the first subarray and second subarray are mutually distinct, meaning that they differ by at least one antenna element of the antenna array. The first transmit beam and second transmit beam are transmitted such that they are distinguishable on receive, through, e.g., TDMA, CDMA, and/or DDMA. The first transmit beam and second transmit beam are preferably each transmitted toward boresight of the antenna array.

Additionally, at least two more transmit beams (i.e., a third and fourth transmit beam) can be transmitted from a third and fourth subarray, respectively. The first, second, third, and fourth subarrays are mutually distinct, meaning that they each differ from the other subarrays by at least one antenna element. The additional transmit beams are transmitted with distinct skew angles that are othorgonal to skew angle $\Delta u = \Delta$ and skew angle $\Delta u = \Delta$. This permits two-dimensional angle estimation with two dimensional arrays (or with three dimensional conformal arrays). The additional transmit beams are transmitted such that the first, second, third, and fourth transmit beams are distinguishable on receive, through, e.g., TDMA, CDMA, and/or DDMA.

At step 404, a first receive signal is received from the antenna array phased to point in the direction of skew angle $\Delta u = \Delta$, and a second receive signal is received from the antenna array phased to point the second receive signal in a direction of the second skew angle $\Delta u = -\Delta$.

To the extent that third and fourth transmit beams are transmitted in step 402, step 404 can further include the steps of appropriately phasing the antenna array to receive a third receive signal skewed in a direction orthogonal to skew angles $\Delta u = \Delta$ and $\Delta u = -\Delta$ and phasing the antenna array to receive a fourth receive signal skewed in a direction orthogonal to skew angles $\Delta u = \Delta$ and $\Delta u = -\Delta$. The skew angles of the third receive signal and the fourth receive signal are distinct and are selected such that the azimuth angle of the target can be estimated in step 410.

At step 406, a first receive beam corresponding to the first transmit beam and a second receive beam corresponding to the second transmit beam are extracted from the first receive signal and a third receive beam corresponding to the first transmit beam and a fourth receive beam corresponding to the second transmit beam are extracted from the second receive signal. The first, second, third, and fourth receive beams can be extracted according to TDMA, CDMA, and/or DDMA methods, depending on which of these methods were employed to transmit the first and second transmit beams. The result of this step is that two beams are extracted that correspond (i.e., are correlated to) to the first transmit beam and are skewed $\Delta u = \Delta$ and $\Delta u = -\Delta$ and two beams are extracted that correspond to the second transmit beam and are skewed $\Delta u = \Delta$ and $\Delta u = -\Delta$.

To the extent that third and fourth transmit beams are transmitted in step 402, step 406 can further include the steps of extracting a fifth receive beam corresponding to the third transmit beam and a sixth receive beam corresponding to the fourth transmit beam from the third receive signal and extracting a seventh receive beam corresponding to the third transmit beam and an eighth receive beam corresponding to the fourth transmit beam from the fourth receive signal. Here again, the result is that two more beams are extracted that correspond to the third transmit beam and are skewed in the directions of the third and fourth receive signals and two beams are extracted that correspond to the fourth transmit beam and are skewed in the directions of the third and fourth receive signals. The fifth, sixth, seventh, and eight receive beams can be extracted according to TDMA, CDMA, and/or DDMA, depending on the method that the third and fourth transmit beams were transmitted.

At step 408, the first receive beam with the second receive beam are linearly combined to form a first combined beam in direction of skew angle $\Delta u=\Delta$ and the third receive beam with the fourth receive beam to form a second combined beam in direction of the skew angle $\Delta u=-\Delta$.

To the extent that third and fourth transmit beams are transmitted in step 402, step 408 can further include the step of linearly combining the fifth receive beam and the sixth receive beam to form a third combined beam in the direction of the third receive signal and linearly combining the seventh receive beam and the eight receive beam to form a fourth combined beam in the direction of the fourth receive signal.

At step 410, an elevation angle of the target is estimated from the first combined beam and the second combined receive beam. In an example, the elevation angle of the target can be estimated according to amplitude-comparison monopulse, phase-comparison monopulse, or full-vector comparison monopulse. These methods can be implemented through a look-up table, and are understood in the art. Alternatively, the elevation angle of the target can be estimated according through maximum likelihood estimation. This can implemented through a set of matched filters, as will be understood by a person of ordinary skill in the art. It should further be understood that other methods can elevation angle estimation according to the first and second receive beam can be employed.

To the extent that third and fourth transmit beams are transmitted in step 302, step 310 can further comprise estimating, according to the third and fourth combined beams, an azimuth angle of the target. This can likewise be performed through amplitude-comparison monopulse, phase-comparison monopulse, full-vector comparison monopulse, maximum likelihood estimation, or any other suitable angle estimation method.

Figure 5:
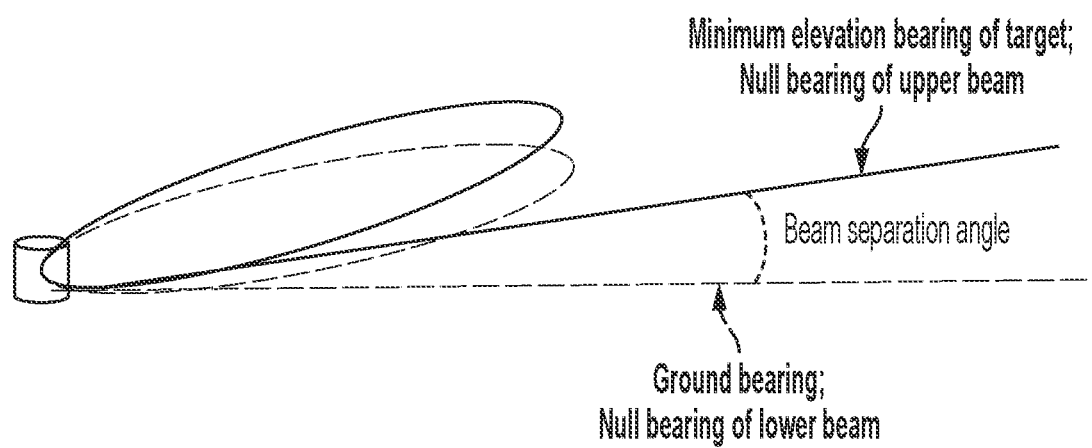
FIG. 5 depicts the beam laydown for avoiding ground multipath and optimizing performance against low-elevation angle targets.
Figure 6:
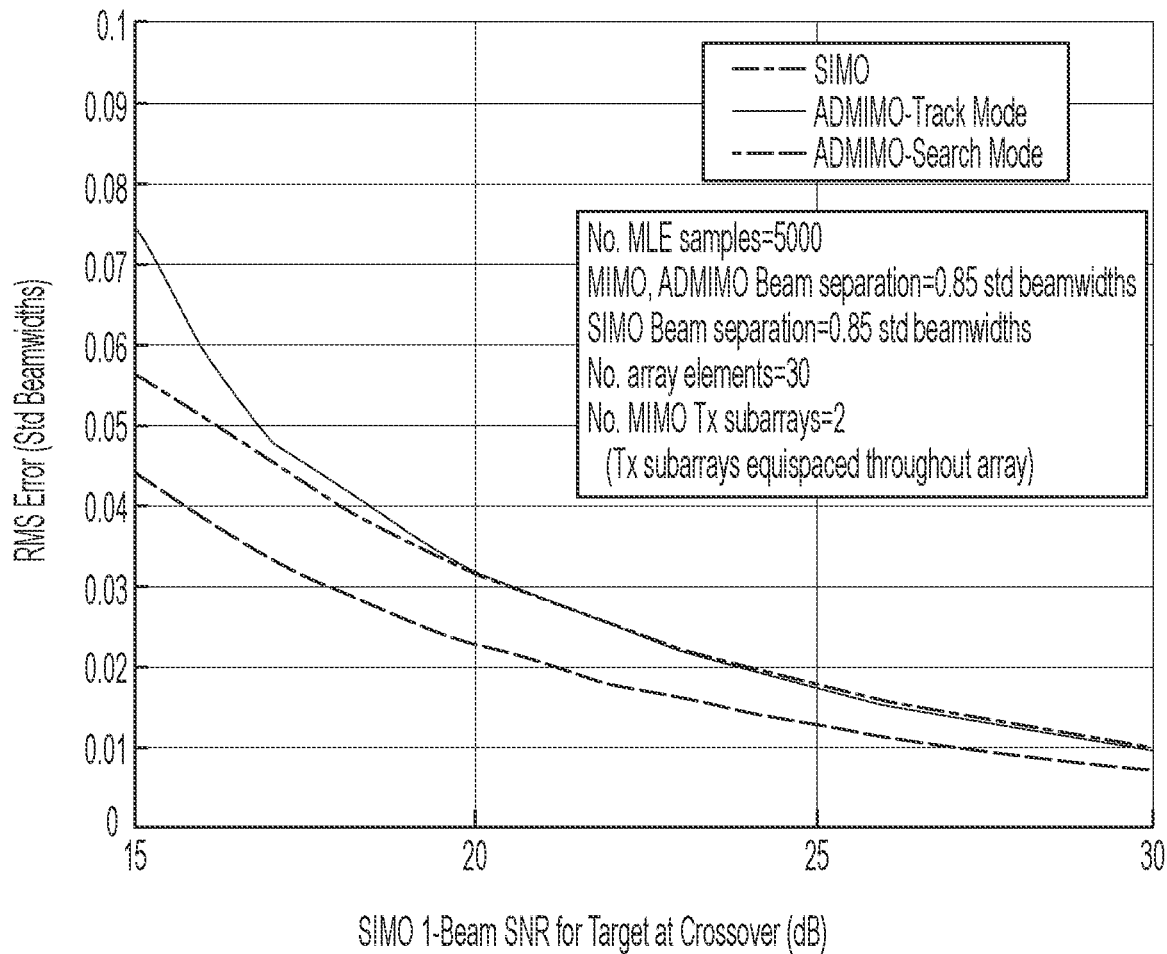
FIG. 6 depicts a plot of maximum likelihood estimation at crossover, according to an example for beam separation of 0.85 standard beamwidths.
Figure 7:
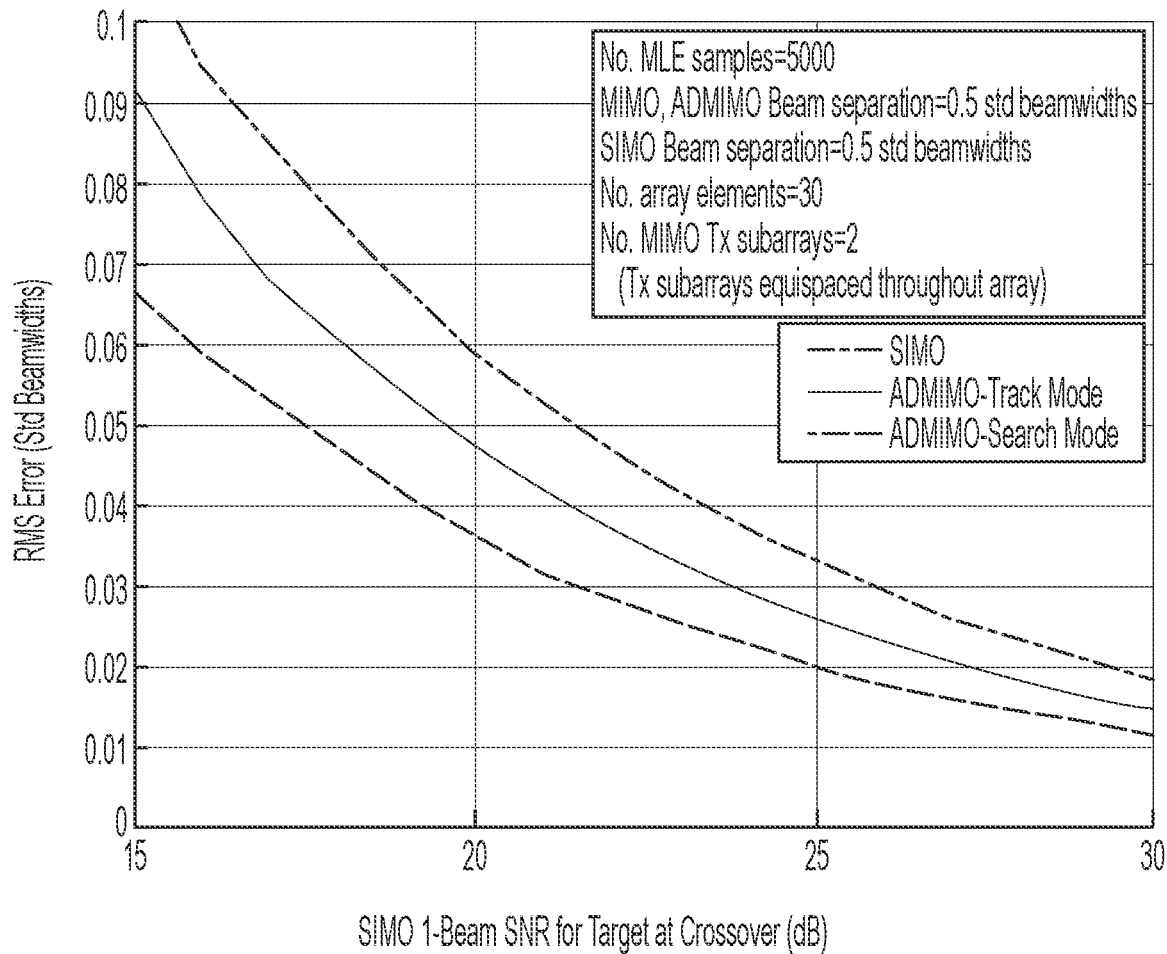
FIG. 7 depicts a plot of maximum likelihood estimation at crossover, according to an example for beam separation of 0.5 standard beamwidths.
Figure 8:
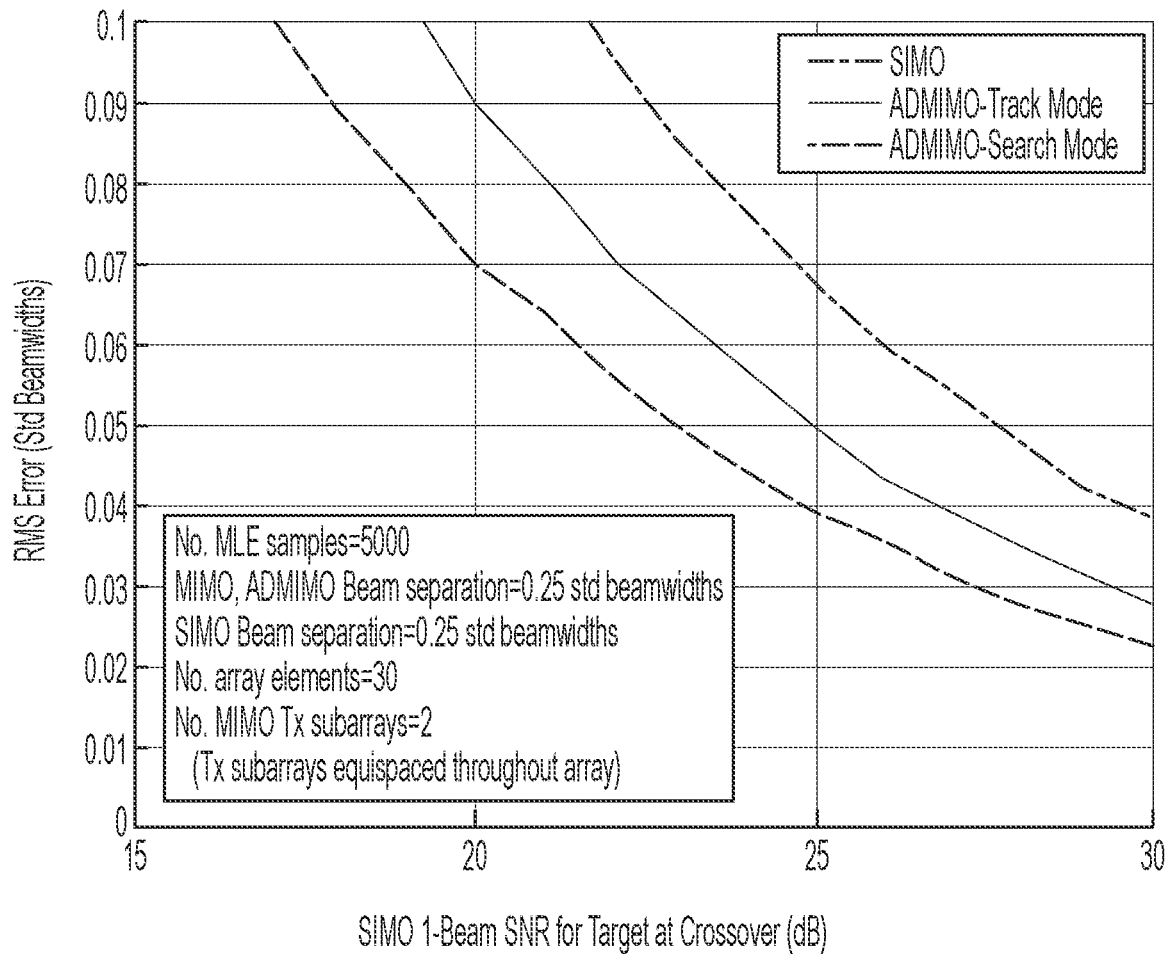
FIG. 8 depicts a plot of maximum likelihood estimation at crossover, according to an example for beam separation of 0.25 standard beamwidths.

FIG. 5 depicts a geometry for a ground based radar tasked to defend against low flying threats. Two squinted low-elevation beams are shown. The lower of the two is positioned such that the lower edge null line of the beam is coincident with ground in order to suppress ground scattering. The angular difference between that line and the upper beam's lower edge null line is a measure of the separation between the beams. Although a wide separation, on the order of 0.85 beamwidths, usually results in the best accuracy, the smaller the separation, the closer the beams and the lower the altitude of a target at which its elevation angle can be determined. FIGS. 6-9 depict simulated results of RMS error against SNR for a target at beam crossover for beam separations of 0.85, 0.5, and 0.25 beamwidths respectively. The transmit and receive arrays have 30 half-wave spaced rows of elements in elevation. The results compare SIMO, ADMIMO Track Mode, and MIMO-Search Mode performance in each case. For MIMO-Search Mode, the array is divided equally into M=2 subarrays displaced in elevation and each transmitting a distinguishable waveform. M 2-way MIMO beams are created each with twice the SIMO dwell time (because in search mode an adjacent dwell position can be processed with same data), thus offsetting the otherwise SNR loss that is proportional to M. Maximum Likelihood Estimation (MLE) was applied with 5000 realizations. As shown, for the 0.85 std. beamwidths separation, MIMO-Search Mode results in approximately 28% improvement over SIMO with M=2 transmitters. Further improvement beyond two transmitters is small. This phenomenon can be explained as follows: The MIMO architecture applied scans the transmit array of subarrays as well as the receive array in forming two lobes for lobe comparison monopulse. The scan is only a fraction of a beamwidth. It follows that more than two transmit subarrays would not provide appreciable improvement because a beam can be well scanned a fraction of a beamwidth with only two phase-shift values, one for each half of the array.

For SIMO, or equivalently the trivial MIMO case of one transmitter, $N_r$ signals are received (corresponding to the $N_r$ array elements). If a broadside beam is formed, it exhibits a 2-way pattern that clearly is the product of transmit and receive patterns, both of which are uniformly weighted. If the aperture is divided into two parts and M independent waveforms are transmitted through each, MN, signals are received with which a broadside 2-way MIMO beam can be created that is exactly the same shape as the broadside 2-way SIMO beam. (In fact, it follows from superposition that the 2-way MIMO broadside sum beam is the same shape as the broadside 2-way SIMO sum beam for any M, although the SNR decreases linearly with increasing M.) However, for SIMO there are only $N_r$ signals with which to estimate angle of arrival. For the 2-transmitter MIMO case there are $2N_r$ received signals $N_r$ of which correspond to transmitting through one half of the array and $N_r$ to transmitting through the other half. The offset transmit phase centers enable improved angle estimation accuracy over SIMO. Hence the improved angle accuracy of 2-transmitter MIMO over SIMO. Larger numbers of transmitters do not yield significant additional improvement for the reason mentioned above. Again, this assessment is contingent on applying MIMO-Search Mode, that is, where the transmit beams are formed on receive in order to avoid excessive SNR loss. ADMIMO Track Mode, on the other hand, is inferior to SIMO for the larger separation because it sustains the 3 dB SNR loss.

If the lobe separation is reduced to 0.5 std. beamwidths, MIMO-Search Mode improvement over SIMO increases to about 38% (FIG. 7) and even ADMIMO Track Mode exhibits superior performance over SIMO. With even smaller separation (0.25 std beamwidths) the improvement of MIMO-Search Mode over SIMO increases to about 43% (FIG. 8) and the benefit of ADMIMO Track Mode increases, as well. A potential application for MIMO-Search Mode (and even ADMIMO Track Mode if MIMO-Search Mode sidelobes are an issue) then is for estimating low elevation angle targets with ground radar. The two beams are offset in elevation such that the main lobe of the lower beam lies just above ground (to avoid severe ground multipath) and the upper beam is elevated above that by only a small amount, as suggested in FIG. 4. An issue that would need addressing is mutual coupling arising from squeezing lobes close together.

Relation between time and frequency domain is generally well known, and is described at least under the realm of Fourier mathematics or analysis, and is accordingly not presented herein. Additionally, signals, transfer functions, or other terms or quantities represented by symbols herein may be operated, considered, or analyzed in analog or discrete form. In the case of time domain terms or quantities, the analog time index, e.g., t, and/or discrete sample index, e.g., n, may be interchanged or omitted in various cases. Likewise, in the frequency domain, analog frequency indexes, e.g., f, and discrete frequency indexes, e.g., k, are omitted in most cases. Further, relationships and calculations disclosed herein may generally exist or be carried out in either time or frequency domains, and either analog or discrete domains, as will be understood by one of skill in the art. Accordingly, various examples to illustrate every possible variation in time or frequency domains, and analog or discrete domains, are not presented herein.

The functionality described herein, or portions thereof, and its various modifications (hereinafter "the functions") can be implemented, at least in part, via computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A radar system, comprising:
   an antenna array including a plurality of antenna elements; and
   a transmitter portion coupled to the antenna array, the transmitter portion being configured to transmit a first transmit beam and a second transmit beam such that the first transmit beam and second transmit beam are distinguishable on receive, wherein the first transmit beam and second transmit beam are formed from a single pulse and are formed using an aperture of the antenna array, wherein the first transmit beam is transmitted with a first skew angle and the second transmit beam is transmitted with a second skew angle, the first skew angle and second skew angle being mutually distinct;
   a receiver portion coupled to the antenna array, the receiver portion being configured to receive from the antenna a first receive signal, the first receive signal being received with the aperture of the antenna array phased to point the first receive signal in a direction of the first skew angle, and to extract from the first receive signal a first receive beam corresponding to the first transmit beam, wherein the receiver portion is further configured to receive from the antenna a second receive signal, the second receive signal being received with the aperture of the antenna array phased to point the second receive signal in a direction of the second skew angle, and to extract from the second receive signal a second receive beam corresponding to the second transmit beam, wherein receiver portion is further configured to estimate an elevation angle of a target according to the first receive beam and the second receive beam.

2. The radar system of claim 1, wherein the aperture is the entire aperture of the antenna array.

3. The radar system of claim 1, wherein the separation between the first transmit beam and the second transmit beam is less than or equal to a beamwidth.

4. The radar system of claim 1, wherein the first transmit beam and the second transmit beam are made distinguishable on receive through at least one of time-division multiple access, code-division multiple access, or doppler-division multiple access.

5. The radar system of claim 4, wherein the first transmit beam and the second transmit beam are formed with opposing chirp waveforms.

6. The radar system of claim 4, wherein the first transmit beam and the second transmit beam are encoded as orthogonal phase shift keyed sequences.

7. The radar system of claim 1, wherein the first receive beam and the second receive beam are extracted according to at least one of time-division multiple access, code-division multiple access, or Doppler-division multiple access.

8. The radar system of claim 1, wherein the elevation angle of the target is determined according to at least one of amplitude-comparison monopulse, phase-comparison monopulse, or full-vector comparison monopulse.

9. The radar system of claim 1, wherein the elevation angle of the target is according to maximum likelihood estimation.

10. The radar system of claim 1, wherein the transmit portion is further configured to transmit a third transmit beam and a fourth transmit beam such that the first transmit beam, the second transmit beam, the third transmit beam, and the fourth transmit beam are distinguishable on receive, wherein the third transmit beam and the fourth transmit beam are formed from the single pulse and using the aperture of the antenna array, wherein the third transmit beam is transmitted with a third skew angle and the fourth transmit beam is transmitted with a fourth skew angle, the third skew angle and fourth skew angle being mutually distinct and being orthogonal to the first skew angle and the second skew angle, such that an azimuth angle of the target is determinable on receive.

11. A method for angle diversity multiple input multiple output radar, comprising the steps of:
    transmitting, from an antenna array including a plurality of antenna elements, a first transmit beam and a second transmit beam such that the first transmit beam and second transmit beam are distinguishable on receive, wherein the first transmit beam and second transmit beam are formed from a single pulse and are formed using an aperture of the antenna array, wherein the first transmit beam is transmitted with a first skew angle and the second transmit beam is transmitted with a second skew angle, the first skew angle and second skew angle being mutually distinct;
    receiving, from the antenna array, a first receive signal, the first receive signal being received with the aperture of the antenna array phased to point the first receive signal in a direction of the first skew angle, and a second receive signal being received with the aperture of the antenna array phased to point the second receive signal in a direction of the second skew angle;
    extracting from the first receive signal a first receive beam corresponding to the first transmit beam and from the second receive signal a second receive beam corresponding the second transmit beam; and
    estimating an elevation angle of the target according to the first receive beam and the second receive beam.

12. The method of claim 11, wherein the first transmit beam and second transmit beam are formed using the entire aperture of the antenna array.

13. The method of claim 11, wherein the separation between the first transmit beam and the second transmit beam is less than or equal to a beamwidth.

14. The method of claim 11, wherein the first transmit beam and the second transmit beam are made distinguishable on receive through at least one of time-division multiple access, code-division multiple access, or Doppler-division multiple access.

15. The method of claim 14, wherein the first transmit beam and the second transmit beam are formed with opposing chirp waveforms.

16. The method of claim 15, wherein the first transmit beam and the second transmit beam are encoded as orthogonal phase shift keyed sequences.

17. The method of claim 11, wherein the first receive beam and the second receive beam are extracted according to at least one of time-division multiple access, code-division multiple access, or Doppler-division multiple access.

18. The method of claim 11, wherein the elevation angle of the target is determined according to at least one of amplitude-comparison monopulse, phase-comparison monopulse, or full-vector comparison monopulse.

19. The method of claim 11, wherein the elevation angle of the target is according to maximum likelihood estimation.

20. The method of claim 11, further comprising the steps of:
    transmitting a third transmit beam and a fourth transmit beam such that the first transmit beam, the second transmit beam, the third transmit beam, and the fourth transmit beam are distinguishable on receive, wherein the third transmit beam and the fourth transmit beam are formed from the single pulse and using the aperture of the antenna array, wherein the third transmit beam is transmitted with a third skew angle and the fourth transmit beam is transmitted with a fourth skew angle, wherein the third skew angle and fourth skew angle are mutually distinct and are orthogonal to the first skew angle and the second skew angle, such that an azimuth angle of the target is determinable on receive.

21. A radar system, comprising:
    an antenna array including a plurality of antenna elements; and
    a transmitter portion coupled to the antenna array, the transmitter portion being configured to transmit a first transmit beam from a first subarray of the antenna array and to transmit a second transmit beam from a second subarray of the antenna array, wherein the first subarray and the second subarray are mutually distinct, wherein the first transmit beam and the second transmit beam are directed toward boresight of the antenna; and
    a receiver portion coupled to the antenna array, the receiver portion being configured to receive from the antenna a first receive signal, the first receive signal being received with an aperture of the antenna array phased to point the first receive signal in a direction of a first skew angle, and configured to receive from the antenna a second receive signal, the second receive signal being received with the aperture of the antenna array phased to point the second receive signal in a direction of the second skew angle, the receiver portion being further configured to extract from the first receive signal a first receive beam corresponding to the first transmit beam and a second receive beam corresponding to the second transmit beam and to extract from the second receive signal a third receive beam corresponding to the first transmit beam and a fourth receive beam corresponding the second transmit beam, wherein the receiver portion is further configured to combine the first receive beam with the second receive beam to form a first combined beam in direction of the first skew angle and to combine the third receive beam with the fourth receive beam to form a second combined beam in direction of the second skew angle, and to estimate an elevation angle of a target according to the first combined beam and the second combined beam.

22. The radar system of claim 1, wherein the aperture is the entire aperture of the antenna array.

23. The radar system of claim 21, wherein the first receive beam and the second receive beam are separated from the third receive beam and the fourth receive beam by less than or equal to a standard beamwidth.

24. The radar system of claim 21, wherein the first transmit beam and the second transmit beam are made distinguishable on receive through at least one of time-division multiple access, code-division multiple access, or doppler-division multiple access.

25. The radar system of claim 24, wherein the first transmit beam and the second transmit beam are formed with opposing chirp waveforms.

26. The radar system of claim 24, wherein the first transmit beam and the second transmit beam are encoded as orthogonal phase shift keyed sequences.

27. The radar system of claim 21, wherein the first receive beam, second receive beam, third receive beam, and the fourth receive beam are extracted according to at least one of time-division multiple access, code-division multiple access, or Doppler-division multiple access.

28. The radar system of claim 21, wherein the elevation angle of the target is determined according to at least one of amplitude-comparison monopulse, phase-comparison monopulse, or full-vector comparison monopulse.

29. The radar system of claim 21, wherein the elevation angle of the target is according to maximum likelihood estimation.

30. The radar system of claim 21, wherein the transmit portion is further configured to transmit a third transmit beam from a third subarray and a fourth transmit beam from a fourth subarray, such that the first transmit beam, the second transmit beam, the third transmit beam, and the fourth transmit beam are distinguishable on receive, wherein the third transmit beam is transmitted with a third skew angle and the fourth transmit beam is transmitted with a fourth skew angle, the third skew angle and fourth skew angle being mutually distinct and being orthogonal to the first skew angle and the second skew angle, such that an azimuth angle of the target is determinable on receive.

31. A method for angle diversity multiple input multiple output radar, comprising the steps of:
    transmitting, from an antenna array including a plurality of antenna elements, a first transmit beam from a first subarray of the antenna array and a second transmit beam from a second subarray of the antenna array, wherein the subarray and the second subarray are mutually distinct, wherein the first transmit beam and the second transmit beam are directed toward boresight of the antenna;
    receiving, from the antenna array, a first receive signal, the first receive signal being received with an aperture of the antenna array phased to point the first receive signal in a direction of a first skew angle, and a second receive signal, the second receive signal being received with the aperture of the antenna array phased to point the second receive signal in a direction of the second skew angle;
    extracting from the first receive signal a first receive beam corresponding to the first transmit beam and a second receive beam corresponding to the second transmit beam and from the second receive signal a third receive beam corresponding to the first transmit beam and a fourth receive beam corresponding the second transmit beam;
    combining the first receive beam with the second receive beam to form a first combined beam in direction of the first skew angle and the third receive beam with the fourth receive beam to form a second combined beam in direction of the second skew angle; and
    estimating an elevation angle of the target according to the first combined beam and the second combined beam.

32. The method of claim 21, wherein the aperture is the entire aperture of the antenna array.

33. The method of claim 21, wherein the first receive beam and the second receive beam are separated from the third receive beam and the fourth receive beam by less than or equal to a standard beamwidth.

34. The method of claim 21, wherein the first transmit beam and the second transmit beam are made distinguishable on receive through at least one of time-division multiple access, code-division multiple access, or doppler-division multiple access.

35. The method claim 24, wherein the first transmit beam and the second transmit beam are formed with opposing chirp waveforms.

36. The method of claim 24, wherein the first transmit beam and the second transmit beam are encoded as orthogonal phase shift keyed sequences.

37. The method of claim 21, wherein the first receive beam, second receive beam, third receive beam, and the fourth receive beam are extracted according to at least one of time-division multiple access, code-division multiple access, or Doppler-division multiple access.

38. The method of claim 21, wherein the elevation angle of the target is determined according to at least one of amplitude-comparison monopulse, phase-comparison monopulse, or full-vector comparison monopulse.

39. The method of claim 21, wherein the elevation angle of the target is according to maximum likelihood estimation.

40. The method of claim 31, further comprising the steps of:
    transmitting a third transmit beam from a third subarray and a fourth transmit beam from a fourth subarray, such that the first transmit beam, the second transmit beam, the third transmit beam, and the fourth transmit beam are distinguishable on receive, wherein the third transmit beam is transmitted with a third skew angle and the fourth transmit beam is transmitted with a fourth skew angle, the third skew angle and fourth skew angle being mutually distinct and being orthogonal to the first skew angle and the second skew angle, such that an azimuth angle of the target is determinable on receive.

* * * * *